US011885564B2

(12) United States Patent
Thompson et al.

(10) Patent No.: US 11,885,564 B2
(45) **Date of Patent: *Jan. 30, 2024**

(54) APPARATUS AND METHOD FOR DEVELOPING FREEZE DRYING PROTOCOLS USING SMALL BATCHES OF PRODUCT

(71) Applicant: Millrock Technology, Inc., Kingston, NY (US)

(72) Inventors: T. N. Thompson, Kingston, NY (US); Qiming Wang, Kingston, NY (US); Richard Martino, Saugerties, NY (US)

(73) Assignee: MILLROCK TECHNOLOGY, INC., Kingston, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 16/744,309

(22) Filed: Jan. 16, 2020

(65) Prior Publication Data

US 2020/0149815 A1 May 14, 2020

Related U.S. Application Data

(63) Continuation of application No. 15/228,100, filed on Aug. 4, 2016, now Pat. No. 10,605,527.

(Continued)

(51) Int. Cl.

*F26B 5/06* (2006.01)
*F26B 9/06* (2006.01)

(Continued)

(52) U.S. Cl.

CPC .................. *F26B 5/06* (2013.01); *F26B 3/20* (2013.01); *F26B 9/066* (2013.01); *F26B 21/10* (2013.01)

(58) Field of Classification Search

CPC .... F26B 5/06; F26B 3/20; F26B 9/066; F26B 21/10

See application file for complete search history.

(56) References Cited

U.S. PATENT DOCUMENTS 3,199,217 A 8/1965 Oldenkamp
5,090,132 A 2/1992 Kobayashi (Continued)

FOREIGN PATENT DOCUMENTS

JP 2-169984 6/1990
JP 2014-214992 11/2014

OTHER PUBLICATIONS

Chen et al. Comparative Rates of Freeze-Drying for Lactose and Sucrose Solutions as Measured by Photographic Recording, Product Temperature, and Heat Flux Transducer, 2008, p. 367-374 (Year: 2008).*

(Continued)

*Primary Examiner* — Jessica Yuen

(74) *Attorney, Agent, or Firm* — NIXON & VANDERHYE, P.C.

(57) ABSTRACT

A method and apparatus for eliminating or minimizing the non-uniformity of edge vials compared to center vials during freezing or primary drying of product therein in a freeze dryer. A temperature controlled surface is positioned in close proximity to or in contact with the edge vials to control the temperature thereof. The method and apparatus may be used to simulate in a development freeze dryer the conditions of the center and edge vials in a larger batch target freeze dryer.

19 Claims, 11 Drawing Sheets

Related U.S. Application Data

(60) Provisional application No. 62/279,564, filed on Jan. 15, 2016, provisional application No. 62/222,136, filed on Sep. 22, 2015.

(51) Int. Cl.

*F26B 3/20* (2006.01)
*F26B 21/10* (2006.01)

(56) References Cited

U.S. PATENT DOCUMENTS

| | | | | |
|---|---|---|---|---|
| 5,217,210 | A | 6/1993 | Schutzner | |
| 5,398,426 | A | 3/1995 | Connor | |
| 8,434,240 | B2 | 5/2013 | Thompson | |
| 10,605,527 | B2 * | 3/2020 | Thompson | F26B 3/20 |
| 2004/0060191 | A1 | 4/2004 | Sennhenn | |
| 2004/0250441 | A1 | 12/2004 | Haseley et al. | |
| 2008/0060213 | A1 * | 3/2008 | Gehrmann | F26B 5/065 206/530 |
| 2008/0060379 | A1 | 3/2008 | Cheng | |
| 2010/0107436 | A1 | 5/2010 | Velardi et al. | |
| 2011/0107616 | A1 * | 5/2011 | Boebst | A23L 3/363 34/72 |
| 2012/0077971 | A1 | 3/2012 | Kuu | |
| 2014/0373382 | A1 | 12/2014 | Ling | |
| 2017/0082361 | A1 | 3/2017 | Thompson et al. | |

OTHER PUBLICATIONS

Kuu, et al. "Modeling of Heat and Mass Transfer Processes for the Gap-Lyophilization System Using the Mannitol-Trehalose-NaCl Formulation", Research Article—Pharmaceutics, Drug Delivery and Pharmaceutical Technology, Mar. 19, 2014 (13 pages).

Genesis—Brochure: (Jun. 26, 2012) https://web.archive.org/web/20120526014309/http://www.spscientific.com:80/PDFs/Products/Freeze-Drvers---Lyophilizers/Floor-Model-Tray-Pilot-Lyophilizers/Genesis/Genesis---Brochure.pdf (4 pages).

Obeidat, et al. "Development of a Mini-Freeze Dryer for Material-Sparing Laboratory Processing with Representative Product Temperature History" AAPS PharmSciTech (# 2017) DOI: 10.1208/s12249-017-0871-5, Sep. 2017 (11 pages).

Goldman et al., "Heat Transfer Adjustment in a Scale-Down 7-Vial Micro Freeze Dryer for At-Scale Lyophilization Cycle Development and Optimization" Bristol-Myers Squibb Company, Princeton University, Oct. 2017, (1 page).

Geiseler, et al. "The importance of being small: miniaturisation of freeze drying Equipment", European Pharmaceutical Review, Aug. 18, 2017 (11 pages).

Author unknown, "LyoCapsule™ Freeze Dryer", Pharmaceutical online Jul. 17, 2017 (1 page).

T.N. Thompson, LyoPAT™: "Real-Time Monitoring and Control of the Freezing and Primary Drying stages During Freeze-drying for Improved Product Quality and Reduced Cycle Times" American Pharmaceutical Review Fresh Perspectives Nov./Dec. 2013 (7 pages).

* cited by examiner

Expected Drying Pattern

Vial Temperature Profile During Sublimation

One alternate concept of emulator assembly

Thermal emulator

Apparatus on Any Freeze Dryer Shelf - Side View

Apparatus on Any Freeze Dryer Shelf - Top View

Apparatus Example with Flexible Membranes

A circulator fluid filled vessel around a 19 vial nest

A hexagonal fluid filled vessel around a 19 vial nest

APPARATUS AND METHOD FOR DEVELOPING FREEZE DRYING PROTOCOLS USING SMALL BATCHES OF PRODUCT

CROSS REFERENCES TO RELATED APPLICATIONS

This application is a continuation application of application Ser. No. 15/228,100, filed on Aug. 4, 2016 and claims the priority of Provisional Patent Applications No. 62/222,136 filed on Sep. 22, 2015 and No. 62/279,564 filed on Jan. 15, 2016. The contents of each of which are incorporated herein by reference in their entirety.

BACKGROUND OF THE INVENTION

1. Field of the Invention

The present device relates to apparatus and methods for use in controlling the temperature of edge vials in a freeze drying process to enable analysis, development, and optimization of freeze drying protocols with a minimum amount of sample required to develop such protocols.

2. Description of Background Art

Problem: During the primary drying phase of a freeze drying process, edge vials, those which are not surrounded by 6 other vials, will sublimate faster than centers vials, those vials which are surrounded by 6 other vials. The 'edge vial effect' creates two problems:

a. First, in large batches the non-uniformity of edge vials during primary drying result in lower process yields, increased drying times to keep the edge vials below their critical temperature, and inconsistent product quality.

b. Second, when attempting to freeze dry a small batch of product there is a greater percentage of edge vials and the small batch dries significantly faster than a large batch. The result is that a small batch cannot be used to develop freeze drying protocols. Using large batches costs more in product, time, and resources. The need for an apparatus to eliminate the 'edge vial effect' is apparent.

A solution to this problem would have benefits which include but are not limited to:

a. First, in large batches the non-uniformity of primary drying would be eliminated resulting in better yields and more consistent quality and shorter primary drying times.

b. Second, an apparatus would enable a method to use a small batch of product for analyzing and developing freeze drying protocols. This will save significant time, money and resources for the user.

Overview—The freeze drying process is a dynamic heat and mass transfer process that is typically controlled by adjusting the shelf temperature at a given vacuum level over a period of time. The shelf temperature profile is a sequence of discrete steps for the three main processes; freezing, primary drying and secondary drying.

A freeze drying recipe, protocol, or profile that works on one freeze dryer may not work on other freeze dryers due to differences in the heat transfer dynamics inherent to each. Therefore, developing a protocol that can be easily transferred between freeze dryers often requires extensive testing and each profile may need to be modified many times to produce the same, or at least similar, process results.

Currently, the development of freeze drying protocols is done in a rudimentary manner, using a significant amount of product in a larger than necessary freeze dryer, with multiple runs being performed to gather the required data. This iterative process is time intensive and requires an ample amount of product, which can be expensive. A sufficient amount of product may not be available to use this method of protocol development.

The freeze drying process has two major steps: freezing and drying. Each step involves a different heat transfer dynamic between the shelf of the freeze dryer and the product, depending on the number of vials containing the product and the characteristics of the freeze dryer. Freezing is a cooling process with the heat transfer from the product to the shelf at atmospheric pressure. Drying is a heating process wherein heat is added from the shelf to the product while under a vacuum which causes the ice to sublimate.

The heat transfer dynamics of freeze drying are directly affected by the type and quantity of vials and the freeze drying equipment. Creating the right freezing process and primary drying process is critical to developing a robust and efficient freeze drying cycle. It is well understood that a small nest of, for example 1 to 37, vials will freeze faster and sublimate much faster than a full shelf of vials (typically containing 100 to 2000 vials) when processed with the same freeze drying protocol. Larger batches of vials dry more slowly due to reduced radiation effects and cooling from inter-vial heat transfer dynamics. Smaller batches of product have a larger radiation heat transfer component and have a minimal inter-vial cooling effect allowing more of the energy to be transferred into the sublimation process which reduces the drying time and produces different final product results. This has made the creation of freeze drying protocol development with a small batch of vials extremely difficult and mostly impractical up to this point in time.

The concept for developing protocols is to establish meaningful freezing and primary drying profiles in a Source Freeze Dryer ("SFD") using a small batch that is intended to mimic the characteristics and conditions of larger batches that are used in production, which is the Target Freeze Dryer ("TFD"). While mimicking the TFD as closely as possible, critical process parameters can be monitored and/or controlled, and used to develop a transferrable freeze drying protocol.

Freezing—

Proper freezing is required to improve the sublimation process and to protect the product. Achieving the proper size and consistency of the ice crystals are critical to creating good product. Larger ice crystals as well as intra-vial consistency enables more efficient primary drying. Some products may also exhibit unwanted changes in pH, precipitation, or phase separation if not properly frozen.

Freezing, in the freeze drying process occurs in several discrete steps. The process consists of super-cooling the liquid, nucleation where 3-19% of the water is crystalized, the growth of the ice crystal structure in the minimal freeze concentrate until all the water is frozen and finally the solidification of the maximal freeze concentrate to a temperature below the glass transition temperature. Proper crystal structure, which typically comprises high porosity, enables more efficient primary drying and helps produce a visually appealing cake and may aid in reducing reconstitution time. At times an annealing step, which involves holding the product at a temperature above the final freezing temperature for a certain period of time, may be added to encourage crystallization of the excipients and to allow the ice crystals to increase in size prior to primary drying.

Nucleation—

In typical applications, a freezing protocol is used which reduces the shelf temperature at a specified rate and holds the shelf temperature for a period of time to ensure the product is frozen and stable. When cooling the shelves at a programmed rate, nucleation occurs in an undesirably random fashion resulting in inconsistent crystallization across a batch which results in extended primary drying times and inconsistent product results.

During the freezing process energy is removed from the vials by cooling the shelf surface. The product temperature cools below its freezing point (super-cools) until there is a nucleation event in one of the vials. The nucleation event is an exothermic event which raises the temperature of the product and vial to near 0 C. In a closely packed array of vials, the nucleating vial prevents adjacent vials from nucleating by adding releasing heat and increasing their temperature. Before the adjacent vials can nucleate, the nucleating vial must complete the ice crystallization process and reduce in temperature. Once the available water in the product is crystalized and the exothermic reaction energy is reduced, another adjacent vial can nucleate. This process results in vials nucleating at differing temperature and rates, which produces differing ice structures in the vials. The result is a primary drying cycle that can only sublimate at the rate of the vial with the least favorable ice crystal structure, and therefore a longer than necessary primary drying cycle is necessary. When a small batch of product is used, the vials will nucleate and freeze faster resulting in a crystal much different than a large batch and therefore will produce different results.

To produce a more consistent crystal structure across the batch a method of controlled or forced nucleation can be applied wherein the liquid product is super-cooled to a predetermined temperature and then an activation event is created which forces the nucleation process. Typically, all vials nucleate at the same time, temperature, and rate which results in very uniform initial crystal structure across the batch. For more consistent intra-vial crystal structure a method for controlling heat flow may be added after controlled nucleation occurs.

If controlled nucleation is performed, only a fraction of the available water crystalizes, and the majority of crystal growth occurs post-nucleation. Controlling the heat flow after nucleation is critical to produce a more uniform intra-vial crystal structure, enabling shorter primary drying times and improving product consistency and quality.

During the freezing process energy is removed from the vials by cooling the shelf surface. The product temperature cools below its freezing point (super-cools) until there is a nucleation event in one of the vials. The nucleation event is an exothermic event which raises the temperature of the product and vial to near 0 C. In a closely packed array of vials, the nucleating vial prevents adjacent vials from nucleating by adding releasing heat and increasing their temperature. Before the adjacent vials can nucleate, the nucleating vial must complete the ice crystallization process and reduce in temperature. Once the available water in the product is crystalized and the exothermic reaction energy is reduced, another adjacent vial can nucleate. This process results in vials nucleating at differing temperature and rates, which produces differing ice structures in the vials. The result is a primary drying cycle that can only sublimate at the rate of the vial with the least favorable ice crystal structure, and therefore a longer than necessary primary drying cycle is necessary. When a small batch of product is used, the vials will nucleate and freeze faster resulting in a crystal much different than a large batch and therefore will produce different results.

Drying—

Once the product is frozen, the pressure in the chamber is reduced and primary drying may begin. Drying can be further divided into primary drying and secondary drying steps. Primary drying is a sublimation process where ice in a frozen product turns directly into vapor which is then condensed on a cold condensing surface leaving behind a matrix of concentrated product in the vial or tray on the shelf. Secondary drying is a desorption process; the remaining moisture in the concentrated product matrix is reduced to a level that is best for the product's long term stability.

Freeze drying requires a process to efficiently remove water without losing the product matrix structure created during the freezing step. The key to an optimized drying cycle is keeping the product at a temperature slightly below its critical temperature, which is the product temperature above which the product melts and/or the matrix collapses. The critical temperature is determined by the operator and may be either the measured eutectic, glass transition or collapse temperature, whichever is highest in temperature. There may also be applications when some form of collapse is required. The process to efficiently remove water without losing the product matrix structure can be monitored, optimized and controlled for these applications.

From a process development perspective, cycle optimization results in a shelf temperature and chamber pressure combination that balances the heat and mass flow and maintains the product at its optimum temperature. Traditionally this is a very challenging task which involves a multi-step 'trial and error' approach, and is further complicated by the differing heat transfer dynamics between freeze dryers and batch sizes. This approach can result in large amounts of wasted product if multiple runs are required to achieve cycle optimization.

Heat transfer during freeze drying is a dynamic process. The total amount of heat applied to the product comes from a combination of sources including: the shelf; gas conduction; convection; radiation and inter-vial heat transfer. The proportion of the total heat from each source differs due not only to equipment and application differences, but also due to interaction between the vials.

During sublimation the shelf temperature is controlled to add heat to the product causing the ice to sublimate into vapor. Sublimation is an endothermic event, which results in a low product temperature at the sublimation front. Although the shelf may be at −15° C. the product at the bottom of the vial may be −20° C. and the temperature at the sublimation front will be at the lowest temperature, for example −35° C. When freeze drying large batches of vials, the majority of vials are surrounded by at least two outside rows of vials and there are multiple rows of vials, there is a significant amount of inter-vial cooling which slows the sublimation process. When a small batch of product is freeze dried there are a significantly larger percentage of edge vials and the inter-vial cooling effect is greatly reduced and therefore the sublimation rates are much higher.

Center vs Edge Vial—(FIGS. 1A, 1B)

A "center vial" may be defined as a single vial surrounded by at least two outside rows vials. The vast majority of vials in a larger freeze dryer are considered center vials. Center vials are exposed to minimal radiation heating and experience a cooling effect from their surrounding vials that are sublimating which results in slower freezing, lower sublimation rates, and longer drying times.

An “edge vial” can be defined as a vial that is not surrounded by two outer rows of vials. An edge vial will experience a greater amount of heat from radiation and less inter-vial heat transfer effects from surrounding vials, which results in faster freezing and faster drying times. The outer 2 to 3 rows of a tray of vials experiences an “edge effect” resulting in shorter drying times than center vials. Therefore, a small batch of vials will act more like edge vials than center vials and will therefore freeze faster and dry faster. In a 19 vial nest arranged in a hexagonal pattern (FIG. 2), the outer 2 rows are edge vials, so 18 of the 19 vials act like edge vials. A goal in freeze drying is to have the vials process uniformly for consistency and repeatability, the edge vial effect needs to be minimized to produce a consistent product.

The rate of freezing and sublimation is determined by the combined heat flow of all of the heat sources. The sources of heat flow vary between freeze dryers and batch sizes and therefore freezing and primary drying times vary. In addition, the variation in heat sources can produce differences in the dried product across the batch.

Experiments—

Table 1 (Appendix A)—To test the effect of different heat sources a series of experiments was executed. A full tray of product (12"×24") was processed in a laboratory scale freeze dryer and the primary drying time was measured. Next 19 vials were processed in the same laboratory scale freeze dryer using the same freeze drying protocol. The 19 vials dried in 512 minutes versus 636 minutes for a full tray. The drying time for 19 vials was over 120 minutes shorter.

Based on common theory the faster drying when 19 vials are processed is caused by a larger percentage of the vials being exposed to radiation from the warm walls and door of the freeze dryer. In an effort to understand and control this variation, experiments were performed using a temperature controlled wall in a small freeze dryer. A small scale freeze dryer having a 6" diameter shelf and a temperature controllable wall was developed. 19 vials were placed in the small freeze dryer and the sublimation uniformity and sublimation times were measured. The sublimation uniformity was measured at a point where approximately 25% of the water should have been removed. Each vial was weighed and the amount of water removed and the percentage dryness was determined. Next the temperature of the wall was reduced to −40 C to minimize radiation from the wall. Then in successive runs insulation was added around the product to shield the vials from all potential sources of radiation.

In all cases the 19 vials dried significantly faster than a full tray. Reducing the wall temperature results in reduced heat transfer from radiation sources. However, experiments with the wall temperature reduced to −40 C and with the vials insulated from any potential radiation sources resulted in a minimal change in primary drying time and minimal improvement of sublimation uniformity across the batch of vials. Therefore, reducing the temperature of the wall and implementing a radiation shield had marginal effect on the process and was not able to simulate the processing times of larger systems and larger batches of product.

Conclusion: The difference in drying times between large and small batches is not predominately a result of radiation, since minimizing radiation minimally improved the sublimation rate and uniformity across the batch. It was then hypothesized that there is a major heat transfer effect from vials being surrounded by other vials. So, another set of experiments would need to be developed to test the theory that there is a reduction in sublimation rate and better sublimation uniformity when vials are completely surrounded by other vials.

What is needed is an apparatus and method for simulating and quantifying the heat transfer dynamics created by the inter-vial heat transfer dynamics from adjacent vials in large batches, in both freezing and primary drying, when only a small batch of product is used, for example 1 to 37 vials. A method and apparatus to simulate the heat flow from adjacent vials enables the user to test the limits of operation, simulate the heat transfer dynamics of larger systems and larger batches, develop optimized freeze drying protocols, and develop transferrable protocols for a particular product.

There are many methods to transfer protocols once an optimized protocol is developed. One example of a method to transfer an optimized primary drying protocol is to determine the Thermal Conductivity of the Vial (Kv) in both the SFD an TFD, then use the Kv values to determine the TFD shelf temperature based on the SFD shelf temperature.

Example of one method to transfer the protocol from primary drying from a SFD to TFD:

$$Tshelf\ TFD = \left(\left(\frac{KvSFD}{KvTFD}\right) * (Tshelfsource - Tproductsource)\right) + Tproduct$$

Definitions

TshelfTFD—Target shelf surface temperature (degrees C.)

KvSFD—Vial Thermal Conductivity Source Freeze Dryer

KvTFD—Vial Thermal Conductivity Target Freeze Dryer

Tshelfsource—Source shelf surface temperature

Tproductsource—Source product temperature

Tproduct—Target product temperature

SUMMARY OF THE INVENTION

Solution—Apparatus:

A temperature controlled surface (Thermal Emulator) with a temperature range of −80° C. to +105° C. or better that is in contact or close proximity to the vials. When processing a small batch of vials the edge vials may be temperature controlled and therefore the edge vial effect can be controlled and eliminated.

a. The apparatus can be designed to be in contact or close proximity to the vials b. The apparatus may use thermal conductors to transfer heat to/from the vials Thermal Conductors which can be made from various materials, in various configurations and sizes, can be used to better enable the thermal transfer. These may be solid or flexible in nature and may be fluid filled if need be.

The contact to the surface of the vials, whether it be directly to the temperature controlled surface or via a thermal conductor, can be aided using a thermal conductive paste, fluid, or other material, or using a flexible membrane, that may or may not be fluid filled, that can expand and contract.

The method of temperature control includes but is not limited to direct refrigeration, recirculating fluid, thermoelectrics, LN2, forced air or gas, or any other appropriate method.

The Thermal Emulator temperature can be controlled by programmed steps of from product temperature feedback using an appropriate product temperature sensing method, or other method to be defined later.

The apparatus can be mounted in small dedicated freeze dryer or can be installed and implemented in any freeze dryer for temporary or permanent use.

With the ability to process small batches additional features may be added to enable the user to study the process and determine critical process parameters, to optimize protocols, and develop protocols that are transferable to other freeze dryers.

It is an aspect of the invention to provide an apparatus and methods for processing a small sample of vials more uniformly by simulating the conditions of 'center vials' and eliminating the 'edge vial effect'. The method and apparatus simulates the heat transfer dynamics created by the interaction of adjacent or surrounding vials during the freezing, primary drying and secondary drying cycles, while using a small batch of product, for example 1 to 37 vials. The method and apparatus enable a small batch of vials to be used for measurement, analysis, optimization, and simulation of larger freeze drying batches. These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION OF THE INVENTION

Figure 1:
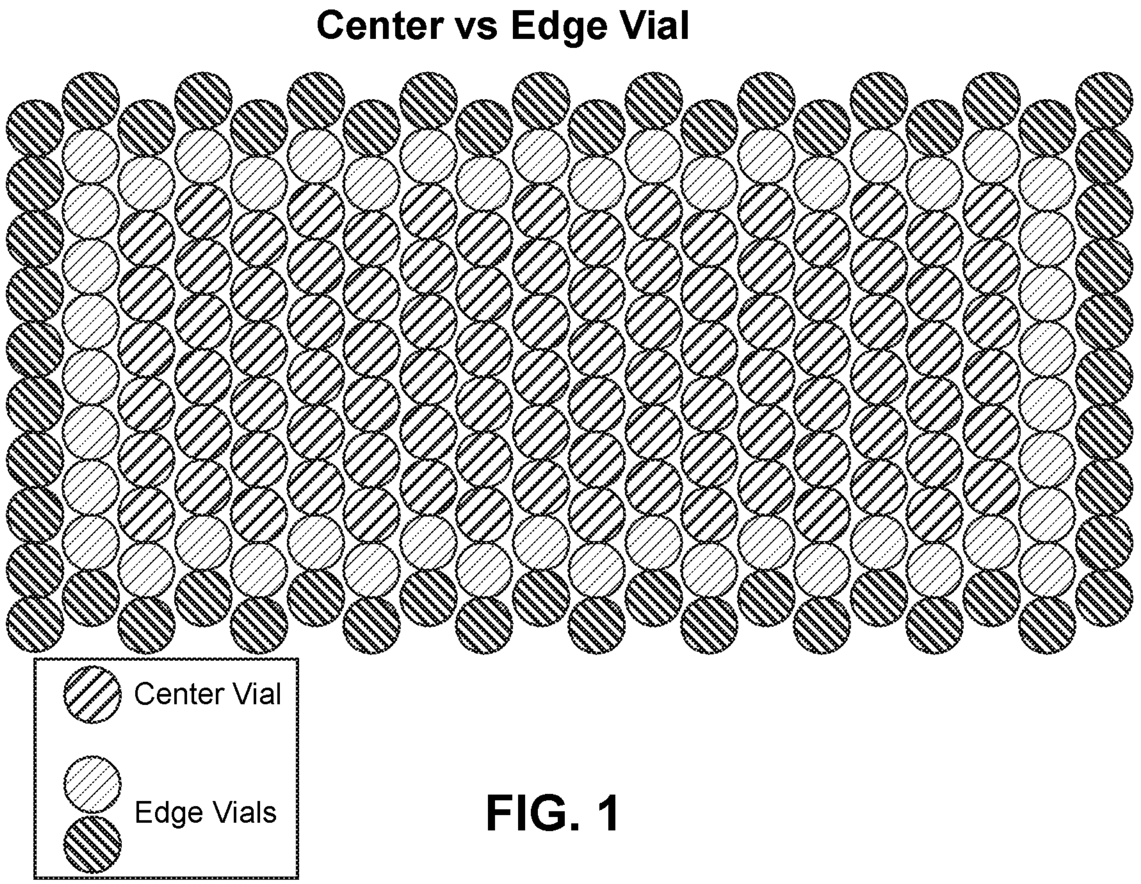
FIG. 1 is a schematic top plan view of a number of vials in a tray indicating those that are "edge vials" and those that are "center vials"

This description of the exemplary embodiments is intended to be read in connection with the accompanying drawings, which are to be considered part of the entire written description. In the description, relative terms such as "lower," "upper," "horizontal," "vertical," "above," "below," "up," "down," "top," and "bottom," as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," and "interconnected," refer to a relationship wherein structures are secured or attached to one another either directly or indirectly through intervening structures, as well as both movable or flexible or rigid attachments or relationships, unless expressly described otherwise. 'Vial' will refer to any container type, such as vial, syringe, tray, well plate, or any other container used to hold the product. 'Development' (or DFD) or 'Source' or (SFD) shall refer to the freeze dryer that is being used to analyze, create, simulate a larger batch target freeze dryer for the purpose of producing a protocol that can be transferred. 'Target' (or TFD) shall refer to the freeze dryer that will be receiving the transferable protocol. 'Protocol' will refer to the recipe, profile, process, or steps that defines the shelf temperature and product chamber pressure or other critical process parameters for a specific order of operations for a freeze drying application. 'Adjacent vial' or 'surrounding vial' refers to a vial that is close proximity or in contact with another vial. A single vial can have a maximum of 6 adjacent vials or be surrounded by 6 vials. 'Center vials' refers to vials that are surrounded by at least two outside rows of vials, 6 in the first outside ring and 12 in the second outside ring. 'Edge vial' refers to a vial that is surrounded by less than two outside rows of vials. 'Edge vial effect' refers to the difference in freezing and drying conditions for edge vials versus center vials. The 'Thermal Emulator' consists of a temperature controlled surface that is in close proximity to the vials, and may or may not include a 'thermal conductor' or other heat transfer device, material, or method to aid in conduction from the thermal emulator to the vials. The 'thermal conductor' or heat transfer device, material, or method may or may not be integral with the 'thermal emulator' and may be in contact or close proximity to the vial. A 'batch' refers to the product placed in the freeze dryer and can be one or many vials or containers. A 'nest' is a small batch of product, such as a group of 19 vials packed together. The term "close proximity" in this specification means that the temperature controlled surface is close enough to the outer edge vials to control the temperature of the edge vials sufficiently to simulate the conditions of center vials The present invention relates to a design, apparatus, and method to use a small sample of a product, for example 1 to 37 vials, in small Development Freeze Dryers ("DFDs") to develop freeze drying protocols that enables an optimized protocol to be developed and easy transfer to larger systems. The method and apparatus simulate different heat transfer conditions, such as those of larger freeze dryers or larger batches, also referred to as "Target Freeze Dryers" or "TFDs" while using a minimal amount of product, as few as 1 to 37 vials or product containers in some instances, with the intent to develop transferrable protocols to any sized system or batch. The key to creating these protocols for larger batches when using a small sample of product is simulating the center vial conditions and eliminating the edge vial effect by simulating the heat from different sources that would be expected in the larger batch, such as conduction from the shelf, radiation from the walls and door, and inter-vial or inter-container dynamics.

Most freeze drying experimentation and protocol development is done in 6 to 10 square foot freeze dryers which requires a significant amount of product and time. With new drug costs increasing, a method to reduce the amount of product used and reduce the time of development is needed. As mentioned above, simulating a freeze drying protocol includes three major steps, each having their unique heat transfer characteristics, including; freezing, primary drying (sublimation), and secondary drying (desorption). Each of these steps need to be controllable. Initial attempts at developing a freeze dryer for small batches, for example 1 to 37 vials, included experimentation with temperature controlled walls to reduce the radiation and other heat input, however, testing has shown that the method of a fully decoupled temperature controlled wall does not produce sufficient results to simulate large batches of vials.

Figure 2:
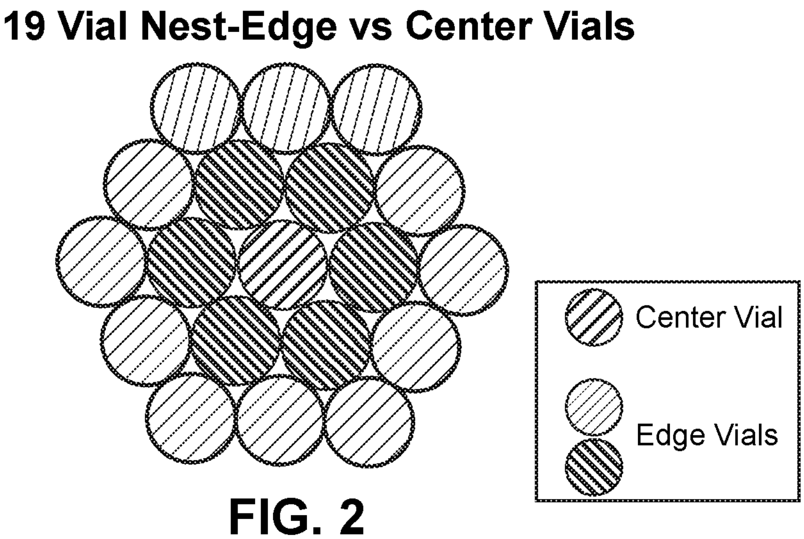
FIG. 2 is a top plan view of a 19 vial nest of vials with indications of center and edge vials.
Figure 3:
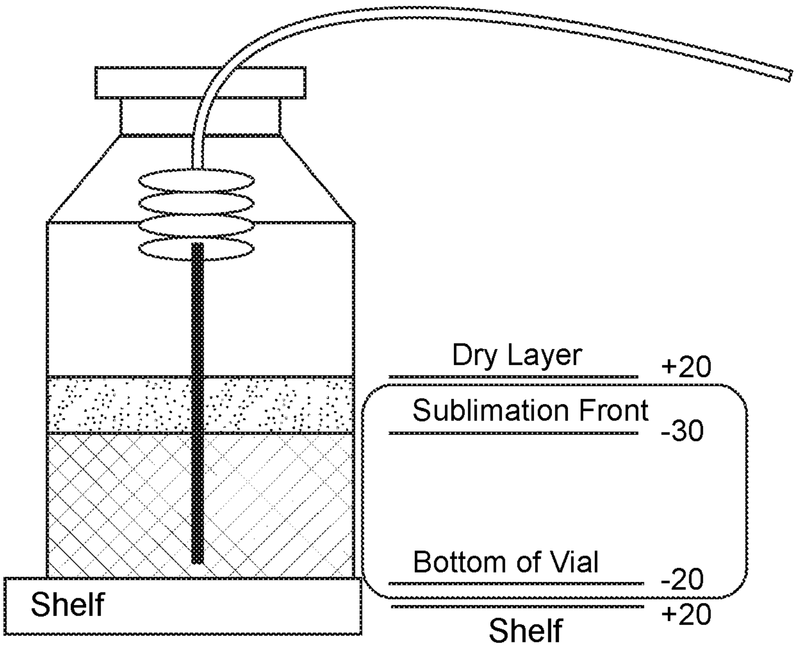
FIG. 3 is a side elevational view representative of the temperature profile inside a vial undergoing sublimation.
Figure 4:
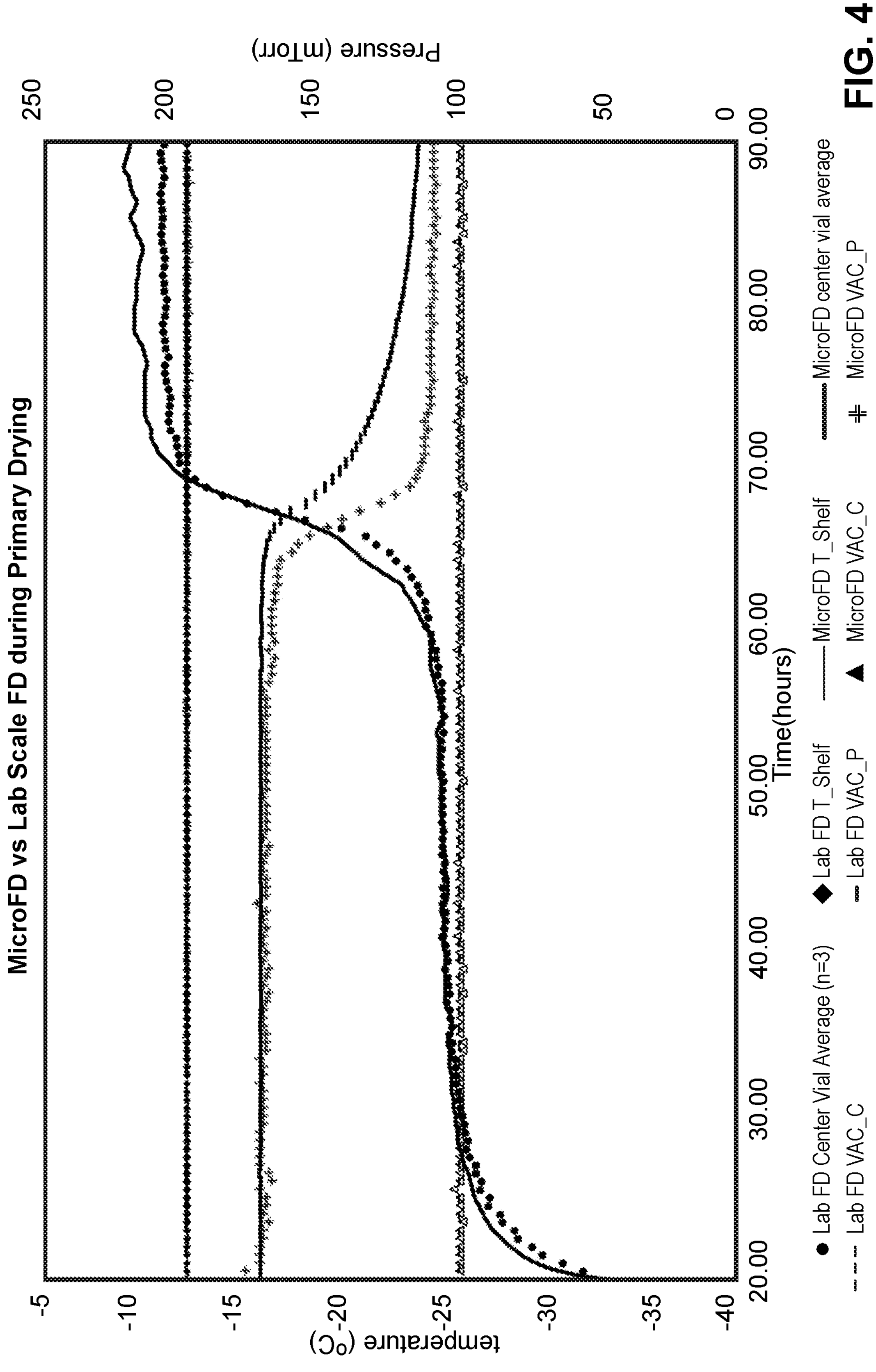
FIG. 4 is a graph showing the temperature profile comparison between a development freeze dryer and a larger batch target or laboratory freeze dryer to demonstrate the ability to simulate the target freeze dryer.

While the current concept could be applied to a wide variety of conditions and circumstances, there are two areas of interest for process simulation, which will be discussed in further detail here, namely "center vials" and "edge vials". (See FIGS. 1, 2). Typically, center vials freeze slower and dry (sublimate and desorb) slower than edge vials. Center vials are each surrounded by at least two outside rows of vials with 6 of those vials being adjacent. Edge vials are typically the outer 2-3 rows of vials on a shelf. An edge vial may have as few as 2 or 3 adjacent vials. Note that the more vials placed on a shelf the smaller the % of edge vials and the larger the % of center vials.

Figure 5:
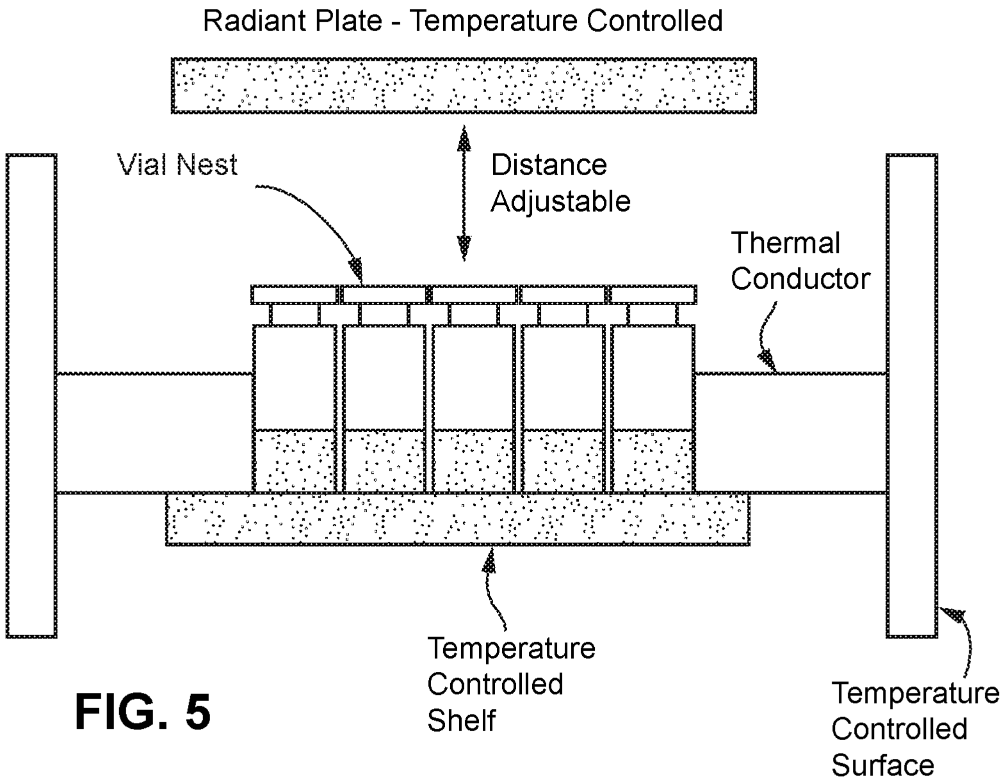
FIG. 5 is side elevational view showing the concept of the apparatus in a Development Freeze Dryer ("DFD") according to one embodiment.
Figure 6:
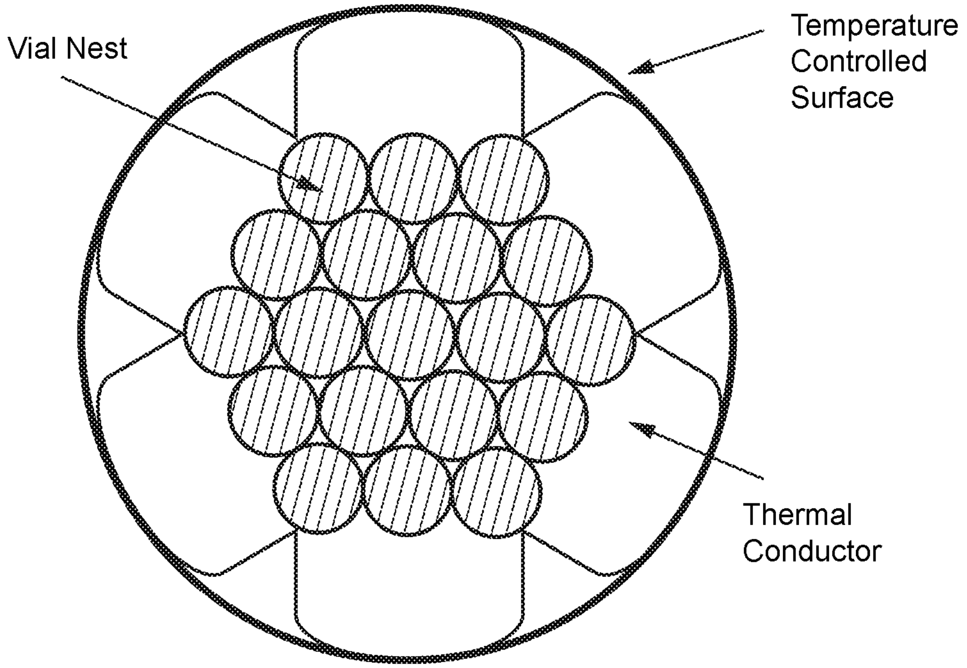
FIG. 6 is a top plan view of a vial nest in a Development Freeze Dryer ("DFD") according to one embodiment.
Figure 7:
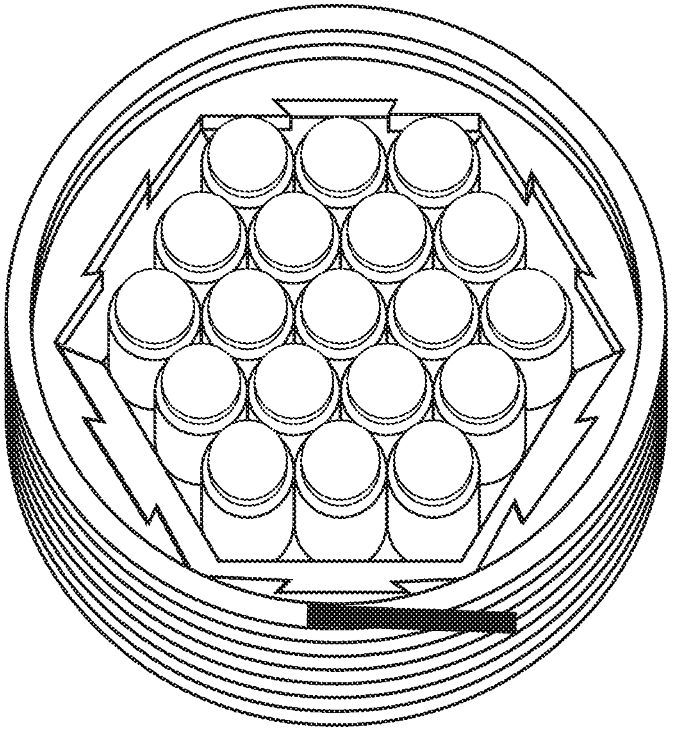
FIG. 7 is a model of one possible configuration inside a freeze dryer where thermal conductors are located in slots in a thermal emulator ring.
Figure 8:
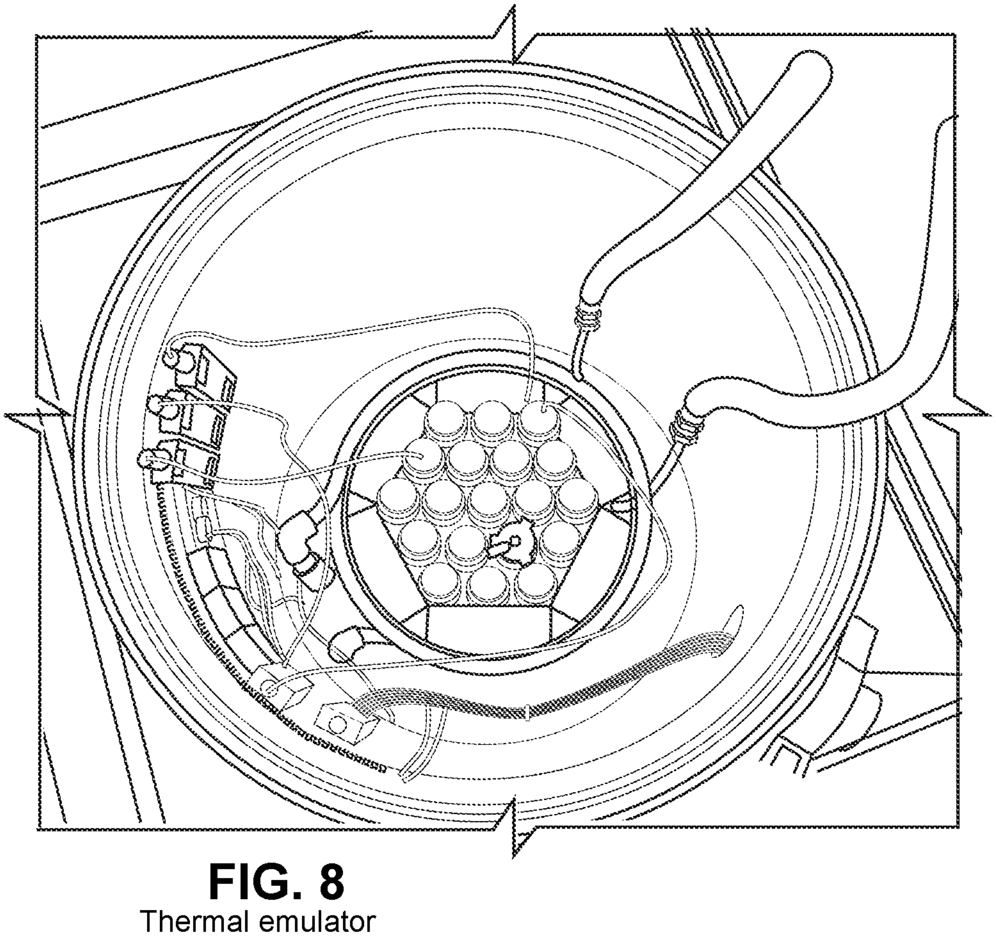
FIG. 8 is an example thermal emulator mounted inside a development freeze dryer chamber with vials and temperature sensors.

The purpose of the present concept is to enable the development of a robust or optimized protocol using a minimal amount of product by eliminating the edge vial effect and mimicking the performance of the target batch as closely as possible to enable an improved or optimized freeze drying profile to be produced, while collecting critical process information that can be used to aid in the development of the target protocol. A method and apparatus is required that can effectively simulate the heat transfer dynamics of larger batches and collect the critical process information. In an embodiment, a method and apparatus can use a thermal emulator closely coupled to edge vials under test to produce conditions similar to those experienced by center vials in a larger batch or TFD. (See FIGS. 5 and 6)

To produce the center vial conditions, a thermal emulator can be placed in close proximity or against the vials or a thermal conduction contact block can be used to conduct between the vials and the thermal emulator. (See FIGS. 5 and 6) This produces a heat flow path that can be adjusted to simulate the local heat flow of the center vials.

Edge vial conditions can also be simulated by controlling the temperature of the thermal emulator with or without the conduction blocks to simulate the radiation and convection that an edge vial may be exposed to. In addition, a corral or other containment may be added to the vial nest to more accurately simulate local conditions of the edge vials.

In an alternative embodiment, a thermal conductor could be integrated with the thermal emulator as a single entity. The conducting surface can then be made adjustable to make contact with vials located at varying distances from the thermal emulator.

The thermal emulator can be of any design such as coiled tubes, an annular shell or any other design or shape. It may be temperature controlled using a circulating fluid, thermoelectric devices, refrigerant direct expansion or any other cooling/heating method. Similarly, it may be heated using circulating fluid, circulating gas, heat pads, or any other heating method known in the relevant art. Additionally, the surface may be designed to have different radiant properties from fully reflective to a black body.

The thermal conductor can be made from any suitable material, such as borosilicate glass, conductive paste, fluid filled container, metal, ceramic or plastic. It may be designed to provide a snug fit or to have a spring loaded function or other method to ensure good contact or close proximity to the vials. The conductor may be designed to have a close proximity, a single point of contact, multiple points of contact, or intimate contact with the vials and the thermal emulator. Additionally, the surface may be designed to have different radiant properties from fully reflective to a black body.

The thermal emulator can be controlled via programmed steps or enabled to track the product temperature dynamically, thus mimicking the changing temperatures or changing heat flow of any measured vial, center or edge, or any other target temperature such as the vial wall.

Figure 9:
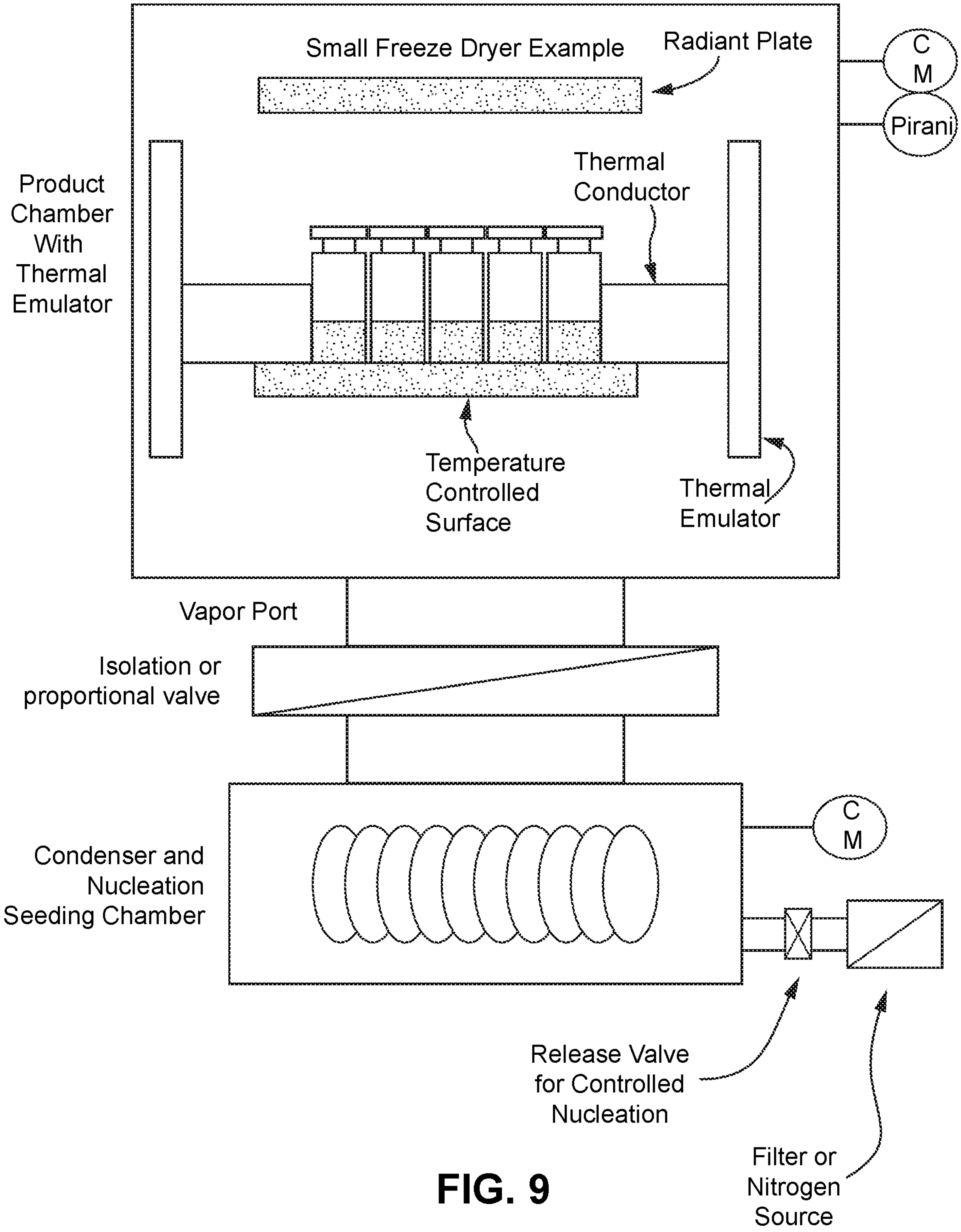
FIG. 9 is a schematic diagram of a small freeze dryer that includes a thermal emulator assembly placed in a small chamber, an isolation valve or proportional valve between the product chamber and condenser for simulating pressure drops between the chambers, an external condenser that can be used for controlled nucleation seed generation including a valve and filter, a capacitance manometer is located on both the product chamber and condenser and a pirani is located on the product chamber for performing end of drying determination and other process control situations.

A further improvement to the apparatus is the ability to control the pressure differential between the product chamber and condenser, to simulate larger batch production freeze dryer conditions. As shown in FIG. 9, a proportional valve is placed in the vapor port between the product chamber and condenser. The proportional valve can be adjusted to develop a restriction and therefore a pressure differential between the two chambers.

The apparatus can include any method of controlled nucleation or other freezing methodology to aid in optimizing the freezing process; any method for measuring, monitoring, and controlling the critical process parameters, such as 'manometric temperature measurement', heat flux measurement and control, tunable laser diode mass flow measurement, or near infrared dryness measurement.

The combination of these technologies provides the tools needed to analyze and control the process, to determine the critical process parameters such as thermal conductivity of the vial, as well as develop improved protocols using a very small batch of vials. These advantages include, but are limited to:

- Ability to simulate either center vials or edge vials, or any other condition experienced by a vial in a larger batch or TFD.
- Minimal sample size to minimize the cost of product required for protocol development
- Simplifies and speeds development of protocols
- Can be used to troubleshoot processing problems experienced with larger batches, such as those in pilot and production sized freeze drying systems
- Works in all phases of freeze drying including; freezing, primary drying, and secondary drying enabling the production of a completely optimized freeze drying protocol.
- Can be used to not only develop robust protocols, but can also be used optimize protocols by determining the conditions for proper freezing and reduced drying time
- Can be used to determine the critical process parameters enabling transfer of the improved protocol to larger batches or the TFD.
- Reduced cost of operation
- Space savings Previous Experiments—

Appendix A—Previous experiments using a temperature controlled chamber wall, fully decoupled from the vials, in a small freeze dryer resulted in reduced heat transfer from radiation sources, but the proportion of heat flow from different sources was not balanced like larger systems and the drying times continued to be shorter than expected and therefore did not fully simulate the larger systems. Experiments with reducing the wall temperature and changing the wall surface for lower emissivity had marginal effect on the process.

APPENDIX a. Experiment 1—shows the sublimation uniformity in a small freeze dryer with the wall temperature at −40 C;
b. Experiment 2—shows the sublimation uniformity in a small freeze dryer with the wall temperature at −40 C and examples of thermal insulation to eliminate radiation;
c. Table 1—Shows the primary drying times of the same freeze drying protocol performed with different size batches and different edge conditions, without a thermal emulator;
d. Experiment 3—shows the improved sublimation uniformity when conducting the temperature of the temperature controlled wall to the outside row of vials in the nest;
e. Experiment 4—shows the further improved sublimation uniformity with a thermal emulator and thermal conductors contacting or in close proximity to the outside row of vials in the nest;

After analysis of these failed experiments, the inventor came to the conclusion that there must be another effect based on the size of the batch. Duplicate freeze drying processes were performed in a small freeze dryer and in a laboratory freeze dryer and the results indicated that there was either a major source of radiation in the small system or a cooling factor with larger batches. Experiments were performed in the small freeze dryer that reduced the wall temperature and shielded the vials from the walls preventing radiation, again the results were not satisfactory.

Conclusion: The faster drying times when processing small batches, for example 1 to 37 vials, is often referred to as the edge vial effect, which is more a result of loss of cooling from adjacent vials sublimating than radiation from warm surfaces. Sublimation, changing the state of ice to vapor, absorbs a significant amount of energy and reduces the temperature of the sublimating vial. Since sublimation is endothermic it is a cooling process and the center vials are surrounded by two or more rows which have a cooling effect on each other. Therefore a center vial experiences lower wall temperatures than edge vials. The sublimation of the adjacent vials dramatically reduces the energy available for the center vial, lowers the wall temperature of the center vial, and results in a reduced sublimation rate and therefore longer primary drying times of the center vial.

Sublimation rate experiment—To test the theory that the difference in sublimation rates is a result of adjacent vials having a cooling effect, the wall of the chamber in the small freeze dryer was closely coupled with the outer vials and the wall was cooled to simulate a temperature that a sublimating vial would produce.

The sublimation rate of each vial in the 19 vial stack was measured before and after adding the thermal conductors. The result of adding the thermal conductor was a significant reduction in drying rate (longer drying time) and an improvement in the uniformity of sublimation across the 19 vial batch.

Experiment 1 shows the uniformity of sublimation with a cooled wall that is fully decoupled.

Experiment 2 shows the results of attempts to eliminate radiation by insulating the 19 vial stack.

Experiment 3 shows the results of coupling the wall.

Experiment 4 shows a coil added to the chamber which is temperature controlled and thermal conductors between the coil and the vials to enable close coupling and temperature control of the outer or edge vials. The result is a significant improvement in sublimation rate uniformity. In addition, the primary drying time was very similar to that of a full tray in a laboratory (Revo®) freeze dryer.

Developing Protocols—

Developing protocols can be performed by simulating the conditions for either center or edge vials in each mode of the freeze drying process; freezing, primary drying, and secondary drying. Below are examples of different processes that may be used. The freezing method produces the ice crystal structure that can impede or encourage primary drying, so multiple methods for freezing can allow the operator to compare and optimize the freezing method. Some methods of operation are described below, these are meant to describe different modes of operation and are not intended to define a limited scope.

1) Freezing—each of these methods can be performed with simulation of center vials or edge vials by controlling the wall temperature of the outside vials in the nest.
    a) Shelf temperature controlled as a sequence of ramps and holds
        i) Temperature of Thermal emulator adjusted via programmed steps
        ii) Temperature of Thermal emulator adjusted by tracking a measured product temperature of one vial or an average of several vials
        iii) Temperature of shelf adjusted by tracking the wall temperature of one vial or an average of vials.
    b) Same as ‘a)’ with an annealing step
    c) Same as ‘a)’ with a controlled nucleation event
    d) Same as “c)’ with the shelf temperature controlled based on heat flow post-nucleation
    e) Reduce shelf temperature based on heat flow
        i) Temperature of Thermal emulator adjusted via programmed steps ii) Temperature of Thermal emulator adjusted by tracking a measured product temperature of one vial or an average of several vials iii) Temperature of shelf adjusted by tracking the wall temperature of one vial or an average of vials.

f) Same as 'e)' with a controlled nucleation event

2) Primary Drying and Secondary Drying—each of the following methods can be performed while simulating either center or edge vials or any other vial condition by controlling the wall temperature of the outside vials in the nest using the thermal emulator in close proximity or contact a) Using #2 above, either simulating center or edge vials or other vial condition, and adjusting the temperature of the thermal emulator to a user entered program sequence b) If thermocouples or other temperature measuring devices are placed in the vials, they can be used as feedback to control the product temperature by adjusting the shelf temperature.

c) Using 'b.' above to keep the product temperature just below the critical temperature.

d) Using 'b' or 'c' above and automatically adjusting the temperature of the thermal emulator based on the changing temperature of the product e) Using #2 above, simulating either center or edge vial or other vial condition, and using heat flux monitoring and control to produce results similar to the TFD system.

f) Using 'e' above and adding product temperature control to keep the product temperature just below the critical temperature.

i) Method 'f' using a thermocouple or other temperature measurement device or method.

ii) Method 'f' where heat flux sensors are used to calculate the product temperature:

$$Tb = Tshelf - \left(\left(\left(\frac{dQ}{dt}\right)/Av\right)/Kv\right) \text{ or } Tb = Ts - (HF/KV) \tag{1}$$

(a) Where Tshelf and dQ/dt are measured and Kv is a constant specific to the application.

(i) Tb=product temperature—C (ii) Tshelf—shelf surface temperature—C (iii) Kv—thermal conductivity of the vial—W/sq M C (iv) dQ/dt—Watts (v) Av—area of the vial—sq M (vi) HF—heat flux—W/SQM The following methods are examples of the different configurations that may be used. It is not meant to limit the scope of operations and is intended solely to provide examples of use.

Method 1—Center Vial Simulation Basic—

Applying a thermal emulator to the outside vials and controlling the temperature of the thermal emulator, either manually or automatically, to eliminate the edge vial effect and therefore simulate center vials. During freezing the thermal emulator can simulate the conditions the outside vials may be exposed to. During primary drying lower edge vial wall temperatures will be achieved which decreases the rate of sublimation and mimics larger batches of product.

Method 2—Center Vial Simulation with Product Temperature Control—

Improving upon Method 1 by additionally controlling the shelf surface temperature based on the product temperature to maintain a specified product temperature.

Method 3—Center Vial Simulation Improved—

Improving upon Method 2 by measuring heat flow and other critical process parameters provides insight into the freezing and drying heat transfer dynamics. Data is used to determine the critical process parameters to develop, improve, and transfer the protocol or can be compared to similar data collected from a larger batch or larger freeze dryer. Critical process information such as; vial thermal conductivity (Kv), product temperature (Tb), and heat flow (dQ/dt) and mass flow (dM/dt) can be collected and other critical process parameters can be calculated, such as; product cake resistance (Rp).

Method 4—Center Vial Simulation Closed Loop Control—

Improving upon Method 3, measuring and controlling heat flow and other critical process parameters provides closed loop control of the process for optimized process results, such as controlling the freezing process at a predetermined, programmed, or calculated heat flow rate for improved ice crystal formation. Drying, both primary and secondary, may also be controlled using heat flow that is controlled at a predetermined, programmed, or calculated heat flow.

Method 5—Center Vial Simulation Closed Loop Control with Product Temperature Control—

Improving upon Method 4, additionally measuring or calculating the product temperature and controlling the shelf temperature to maintain a product temperature to a predetermined level or as close as possible to its critical temperature. This can be used to optimize the primary drying process to reduce total process times.

Method 6—Edge Vial Simulation without Thermal Contact—

Simulating the edge vials can be achieved by removing the thermal conductors, which allows the user to get a better understanding of the impact of the freeze drying process under the extreme edge conditions. As an example, a 19 vial stack with a thermal emulator temperature above the shelf temperature without thermal contact will result in higher radiation and shorter drying times. The outer two rows of vials will be very similar to the edge vials in a large batch.

Method 7—Edge Vial Simulation with Thermal Contact—

Simulating the edge vials with the thermal conductors in place and controlling the temperature of the conductors at higher temperatures allows the user to get a better understanding of the impact of the freeze drying process under the extreme edge conditions. As an example, a 19 vial stack with contact to a thermal emulator above the shelf temperature will result in higher vial wall temperatures and shorter drying times. The outer two rows of vials will be very similar to the edge vials in a large batch.

Traditional freeze drying process control is inefficient open loop control of the shelf temperature without feedback from product temperature and only being able to control the heat transfer fluid temperature from the point at which it flows into the shelf stack. Depending on the different product loads (i.e.: quantity, size and fill of product or vials) as well as the equipment construction (i.e.: shelf construction, fluid pump size and flow rate, etc.) the actual shelf surface temperature varies, although the inlet fluid temperature remains constant, and therefore the product temperatures across a batch can vary. In addition, the heat transfer coefficient changes with vacuum level and vial. This means that the same inlet shelf temperature may result in different product temperatures and therefore different freezing and drying results.

If thermocouples or other temperature measuring devices are placed in the vials, they can be used as feedback to control the product temperature by adjusting the shelf temperature. Typically, the product temperature would be controlled below it's critical or collapse temperature, but there are cases where the product temperature is controlled above the collapse temperature.

The thermal emulator enables different freeze drying batch conditions to be simulated, which enables a small batch of product to be used for studies and process optimization. To further improve the process, the thermal emulator can be controlled via user entered steps or the temperature can be dynamically adjusted via closed loop control based on the product temperature. The unique advantage of tracking the product temperature is that it simulates the conditions that adjacent vials would normally produce. The tracking temperature could be the same as the product temperature, vial wall temperature, or an offset can be used to simulate different operating conditions.

Figure 10:
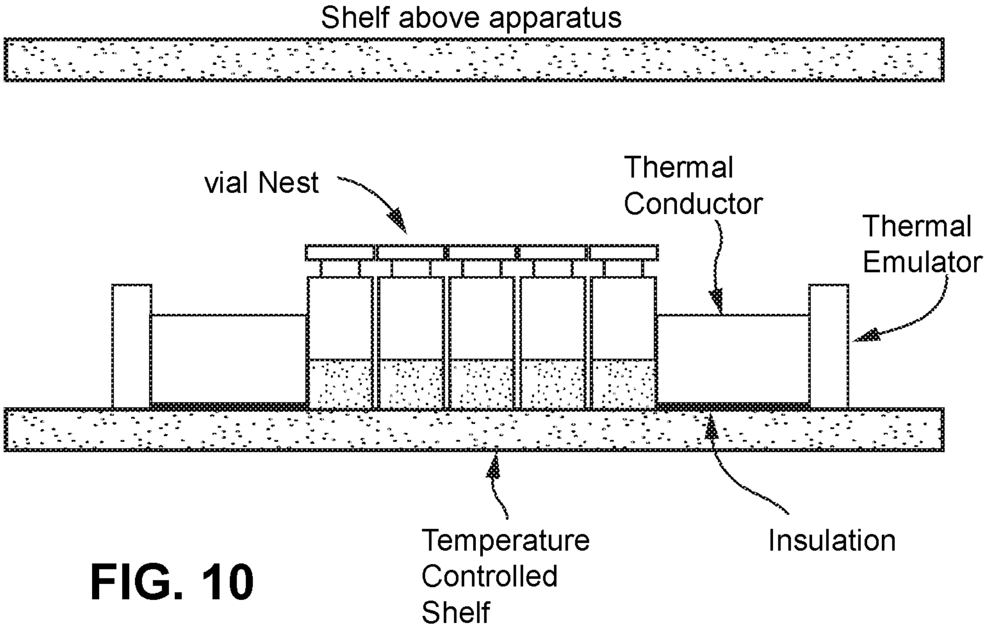
FIG. 10 is a schematic side elevational view of a thermal emulator assembly placed inside a freeze dryer.
Figure 11:
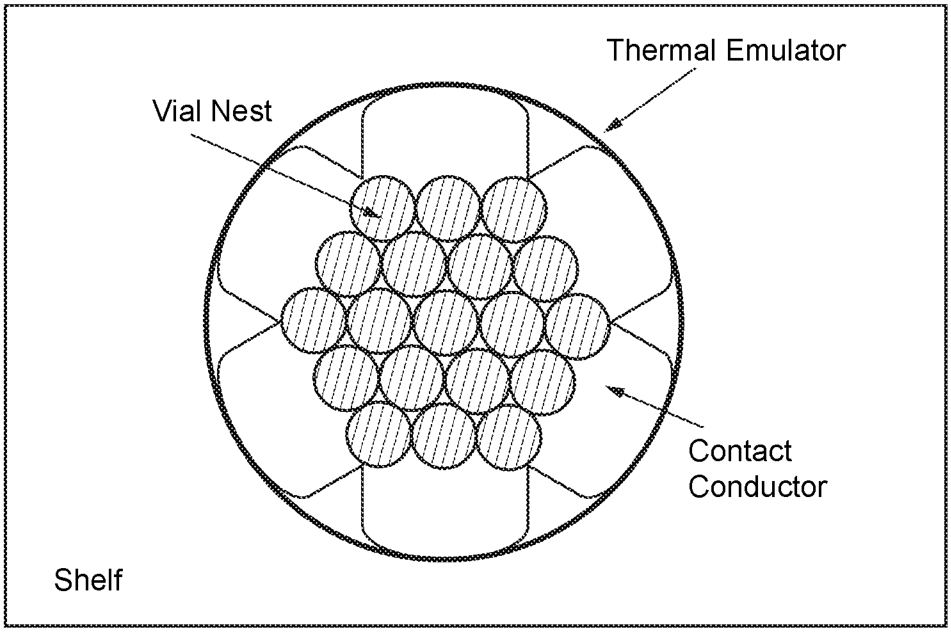
FIG. 11 is a schematic top plan view of a thermal emulator assembly placed on a shelf in a larger freeze dryer.
Figure 12:
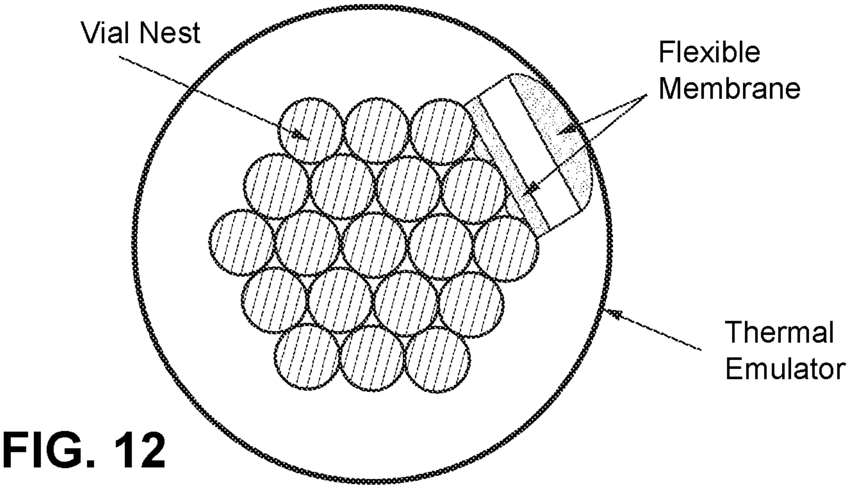
FIG. 12 is a schematic top plan view of a portion of a thermal emulator with flexible membranes for improving thermal contact with adjacent vials.

The thermal emulator apparatus can be configured to fit into any existing freeze dryer enabling protocols to be developed with small batches. The apparatus is simply placed on the shelf. This apparatus will have the same thermal control capabilities where it can control the thermal conditions of the outer vials in a nest. (FIGS. 10, 11)

The thermal emulator concept may also be used to control the edge vial thermal conditions in any freeze dryer, where a thermal emulator, such as a fluid filled tube or other heating or cooling concept, is placed in contact or close proximity to the edge vials (FIGS. 15, 16) and temperature controlled to simulate the product temperature of the center vials or any other condition.

Thermal Emulator Apparatus and Method for Process Development Using a Small Batch of Product in a Small Development Freeze Dryer An apparatus that consists of a small dedicated freeze dryer that simulates the heat transfer dynamics of larger systems using a thermal emulator on a small batch of vials. The key to an effective thermal emulation apparatus is developing a sufficient heat transfer path and a method of temperature or heat flow control to simulate the dynamics of a vial in a freeze drying process. The thermal emulator apparatus must be able to control temperature over a wide range, such as −80° C. to +105° C., while being able to change temperature rapidly to mimic the process dynamics.

Several example methods for the thermal emulation include, but are not limited to:

- Temperature controlling the freeze drying chamber walls which are
  - in intimate or close proximity to the vials
  - which use independent conductors to transfer heat to the vials
- A thermal emulator surface, such as a coil, plate, or other apparatus that is independent of the chamber wall and provides temperature or heat flow control to the vials by
  - Being in direct contact or close proximity to the vials
  - Or uses independent thermal conductors to transfer heat to vials The method for developing the necessary temperatures and heat flow can be varied and may include, but is not limited to, any combination of the following cooling and heating methods inside the temperature controlled surface:

- Cooling using
  - Flowing Liquid in a coil, plate or other configuration
  - Direct expansion of refrigerant in a coil, plate or other configuration
  - Thermoelectric device
  - LN2 or Cold Nitrogen
  - Cooled forced air
  - CO2
  - Or other cooling method
- Heating using a
  - Flowing liquid in a coil, plate, wall or other configuration
  - Resistive heating element of high or low voltage
  - Thermoelectric device(s)
  - Hot gas
  - Forced hot air
  - Or any other appropriate method The temperature controlled surface (thermal emulator) may have a single point of contact, multiple points of contact, may have intimate surface contact, or may be in close proximity to the vials.

The thermal conductors may be made out of a multitude of materials or may be made from a combination of materials, including but not limited to copper, stainless steel, ceramic, glass, conductive rubber, or any other appropriate material.

The thermal conducting surface can be made from a flexible membrane that can expand and contract to provide intimate contact with the temperature controlled surface and the vials. The flexible membrane can be filled with a thermally conductive fluid that is temperature controlled.

A method of spring loading may be used to ensure the best thermal contact between the thermal emulator, the thermal conductor and the vials.

The thermal emulator and thermal conductor can be any shape to meet the application needs. The height of the thermal emulator and thermal conductor may be varied to simulate the height of the product in the vial or any other height that is deemed appropriate for the application.

The contact between the thermal emulator and the temperature source can be enhanced using any appropriate thermally conductive material including, but not limited to, thermal paste, Chomeric rubber, encapsulated paste, encapsulated fluid, glue, epoxy, solder, or any other appropriate material. Another method of contact is the use of a flexible membrane between the temperature controlled surface and the thermal conductor block.

The temperature controlled surface may have a fixed or changeable surface that can be varied to a select emissivity from fully reflective to a black body.

The thermal emulator may also have the ability to produce temperature gradient between the top and bottom surface to simulate the temperature variation of the material being freeze dried. One example of this apparatus is adding a heater to the top surface to create a higher temperature on the top surface, simulating a temperature gradient similar to the dry product vs frozen product.

The temperature of the thermal emulator can be controlled using, but not limited to any of the following:

- A preprogrammed recipe or protocol
- Feedback of the product temperature from one or more of the vials in process
  - Thermocouple
  - Wireless temperature sensor
  - Or other temperature sensing device
- Feedback from a heat flux sensor beneath or near the vials
- Feedback of the product temperature as determined by the heat flux measurement Feedback of the product temperature calculated from a mass flow sensor, such as TDLAS Feedback from product temperature based on manometric temperature measurement Feedback from any other method that determines product temperature The apparatus may be further improved and enhanced by adding apparatus and methods of process monitoring and control to capture critical data and control the process. Examples of the types of instrumentation that may be added include:

Heat flux sensors (U.S. Pat. No. 9,121,637) to determine the heat flow, product temperature and other critical process parameters. Some concepts include, but are not limited to:

Product temperature determination

Heat flow control for ice crystal growth

End of super-cooling

End of freezing

End of primary drying

End of secondary drying

Process analysis

Heat Flux Sensor—

One method of measuring heat flux is to use surface heat flux sensors that are designed to obtain a precise direct reading of thermal transfer through a surface or interface in terms of energy per unit time per unit area. A heat flux monitoring system provides data on the freeze dryer that has previously been unavailable. Either a single sensor between the shelf and vial or multiple heat flux sensors can be used. For example, the sensors can be placed between the shelf and the vial, on the radiant surface above the product, on the vial, on the walls surrounding the product, in the condensing path, etc. Multiple sensors provide more information about the overall process.

Measuring the heat flow enables monitoring and control of the ice crystal growth process. This method enables control of the shelf temperature during phase transition events when there is no product temperature change. Any suitable type of heat flux sensor may be used. As an illustrative example, a low thermal capacitance and low thermal impedance heat flux sensor is suitable for this type of application.

For the purposes of this patent application, standard freezing profiles can be used while the heat flow is monitored for use in determining any differences between the DFD and the TFD. The heat flux sensor can be implemented in various ways. For example: on the shelf surface, in the shelf surface, on the vial, and any other surface. The mounting location is not limited to the shelf for monitoring and control. It may also be mounted on the walls or other surfaces of the freeze drying apparatus that are near the vials or bulk product and may have a significant heat transfer effect on the process.

The heat flux monitoring system can operate in a stand-alone mode to compare any two freeze dryers or can be interfaced with the freeze dryer control system for further automation and data acquisition.

The intent of the DFD is to simulate the heat flow characteristics of larger freeze dryers. Therefore, a method to measure the target system and to control the DFD is needed. A heat flux sensor can be used to identify the proportion of heat flow to the vial, via shelf and other sources, allowing the TFD to be characterized and then simulated in the DFD. In addition, the use of heat flux sensors enables the measurement and calculations of other critical process parameters, such as: Kv, mass flow, cake resistance, etc.

The use of a heat flux monitoring system provides a method to overcome the short-comings of traditional process measurement via temperature. A heat flux monitoring system based on the heat flux measurement between shelf and product and other heat sources is the missing link for producing optimized and improved profiles.

Traditional freeze drying process control is inefficient open loop control due to limited feedback from product temperature and only being able to control the heat transfer fluid temperature from the point at which it flows into the shelf stack. Depending on the different product loads (i.e.: quantity, size and fill of product or vials) as well as the equipment construction (i.e.: shelf construction, fluid pump size and flow rate, etc.) the actual shelf surface temperature varies, although the inlet fluid temperature remains constant. In addition, the heat transfer coefficient changes with vacuum level and vial. This means that the same inlet shelf temperature may result in different product temperatures and therefore different freezing and drying results.

If thermocouples or other temperature measuring devices are placed in the vials, they can be used as feedback to control the product temperature by adjusting the shelf temperature.

Figure 18:
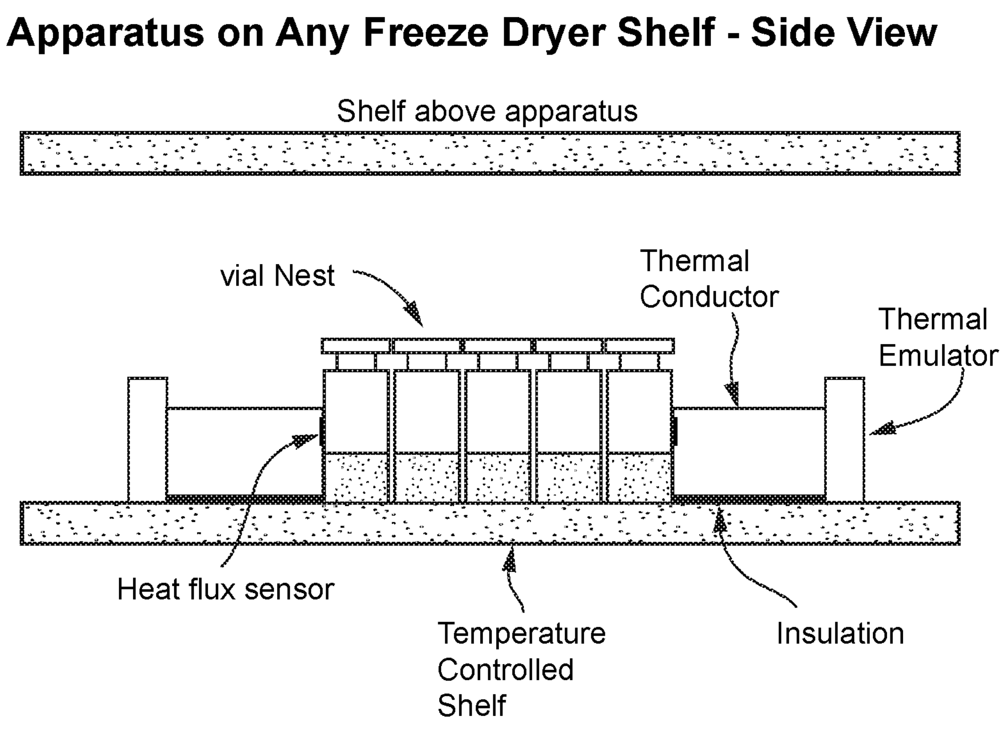
FIG. 18 is a schematic side elevational view of a modified thermal emulator assembly placed inside a freeze dryer.

Critical Process Parameters (FIG. 18)—

Critical Process Parameters ("CPP" include, but are not limited to:

Shelf temperature profile—Ts

Heat flow, dQ/dt

Vial Heat Transfer Coefficient—Kv

Mass-flow, dM/dt

Sublimation front temperature

Product temperature, Tp

Product Cake Resistance, Rp

The heat flux sensor provides in-process information for Heat Flow per unit area. With this information a series of calculations can be performed to provide critical information for control of the freeze drying process. Three critical parameters can be determined, including the Vial Heat Transfer Coefficient ($K_v$), Mass Flow (dM/dt), and Product Resistance ($R_p$). The calculations enable the process parameters to be predicted instead of using the typical 'after-the-fact' open-loop control feedback of thermocouples. This makes heat flux based control a true process analytical tool. Once Kv has been determined the product temperature at the bottom of the vial ($T_b$) can be calculated, thus eliminating the need for an invasive thermocouple for monitoring product temperature Development scenarios using heat flux technology, the following methods relating to the following scenarios can be created: a freezing profile; primary drying profile; and secondary drying profile. One can also develop a baseline optimized freeze dry process profile that is robust and efficient for a DFD. The process data can be collected and stored along with the heat transfer characteristics used. To transfer the profile, the target system critical heat transfer characteristics are first identified. A conversion program can then be used to translate the baseline development cycle to a target system shelf temperature profile or heat flow profile.

The TFD can then execute the profile based on the significant process parameter, which may be either without feedback from sensors or with feedback from a heat flow monitoring system to verify proper operation.

An acceptance dead-band can be created during transfer or translation for quality control purposes. For target systems with the ability to measure heat flow in-process, adjustments can be made to compensate for changes in equipment performance or other process changes.

The Target System Heat Transfer Characteristics can be used as critical process parameters for a development system that has the heat flow measurement system integrated with the control system in a way to simulate the operation of different freeze dryers.

Another benefit from the heat flux method is limited product samples are required to finish the test run as long as they can cover the area of the sensor. Other methods like Tunable Diode Laser Absorption Spectroscopy (TDLAS) require many more samples to generate enough vapor flow for accuracy of measurement. The use of heat flux monitoring enables Quality by Design (QbD) characterization of processes and acts as a Process Analytical Technology (PAT).

Tunable laser diode system to measure mass flow

The temperature controlled conductor concept may also be used to eliminate the edge vial effect in a freeze dryer where a temperature controlled surface, such as a fluid filled tube or other heating or cooling concept, is placed in contact with or close to the edge vials.

Manometric temperature measurement may be implemented to determine the product temperature without the use of thermocouples.

Product temperature determination

End of Primary Drying

The apparatus and method of controlled nucleation can be added to the system to enable the user to test different freezing profiles and their effect on primary drying. Controlled nucleation with the ability to control freezing post-nucleation using thermal emulator enables full control of the freezing process. Any method of controlled nucleation can be used, including but not limited to the following:

- Millrock Technology's controlled nucleation of ice fog and forced ice crystals using pressurization (U.S. Pat. Nos. 8,839,528, 8,875,413)
- Other Ice fog techniques
- Other Forced ice crystals techniques
- Depressurization
- Vibration
- Any other method Process optimization can be performed by testing and improving the freezing process, primary drying process, and secondary drying process. Some, but not all of the possible methods, include:

Control of freezing process for optimum ice crystal formation and structure. Normally a simple ramp and hold are used for freezing, but this method does not produce the optimum ice crystal structure for primary and secondary drying. Using a method of controlled nucleation combined with heat flow control post-nucleation produces the most consistent and primary drying friendly structure, thus providing the foundation for efficient and robust primary drying.

During primary drying, keeping the product temperature slightly below the product critical temperature produces the shortest and most effective process. A method to dynamically adjust the shelf temperature or chamber pressure throughout the cycle can be implemented. Techniques such as the following, but not limited to these methods, may be used:

- Millrock Technology's AutoDry (U.S. Pat. No. 8,434,240) may be used to determine and control the product temperature;
- Millrock Technology's AccuFlux® and LyoPAT® technology (U.S. Pat. No. 9,121,637) may be used to determine the product temperature and provide critical process parameter information for use in improving and transferring the process to another freeze dryer;
- Manometric temperature measurement may be implemented to determine product temperature;

To improve upon the apparatus a method to control the pressure differential between the product chamber and condenser allows the user to simulate the dynamics of production sized freeze dryers. Methods for adjusting the pressure differential include but are not limited to:

- Proportional butterfly valve between product chamber and condenser
- Adjustable ball valve between the product chamber and condenser
- Iris style aperture between the product chamber and condenser
- And other methods of vacuum control that may restrict the flow between the product chamber and condenser Thermal Emulator for Process Development Using a Small Batch of Product in any Freeze Dryer (FIGS. 10 and 11)

An apparatus and method may also be applied to laboratory and production sized freeze dryers to enable simulation of larger batches using a small amount of product, such as 1 to 37 vials.

The apparatus includes a thermal emulator assembly that is in direct contact or close proximity to the vials or uses thermal conductors that are in direct contact or close proximity to both the vial and the thermal emulator. The thermal emulator may be placed on the shelf of the freeze dryer or may be added to the system in a manner that enables proper operation.

The apparatus is added to any freeze dryer with connections either through an available port or through the front door. It may be implemented as a stand-alone system or integrated with the freeze dryer control system and mechanical systems.

The apparatus will have all the same features and capabilities of the small development freeze dryer as described previously.

Figure 13:
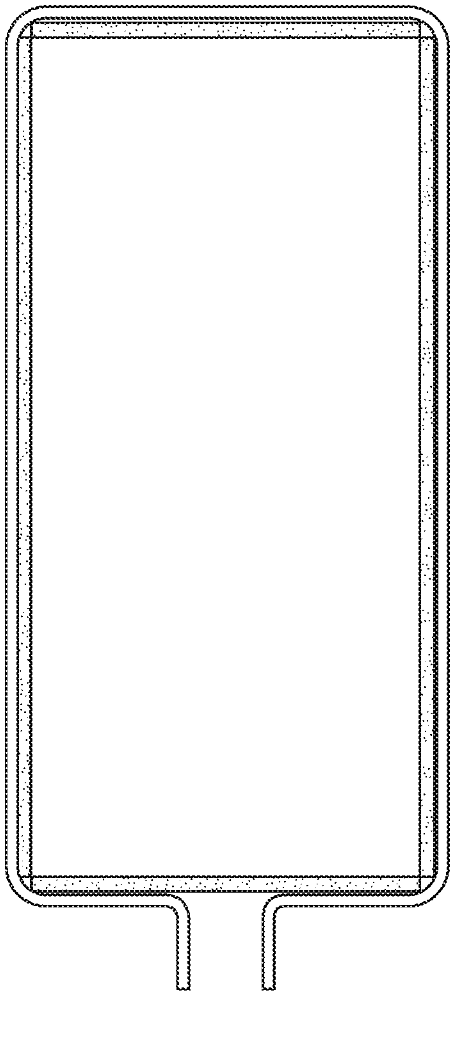
FIGS. 13 and 14 are examples of thermal emulators that may be placed in any freeze dryer to eliminate the edge vial effect.
Figure 14:
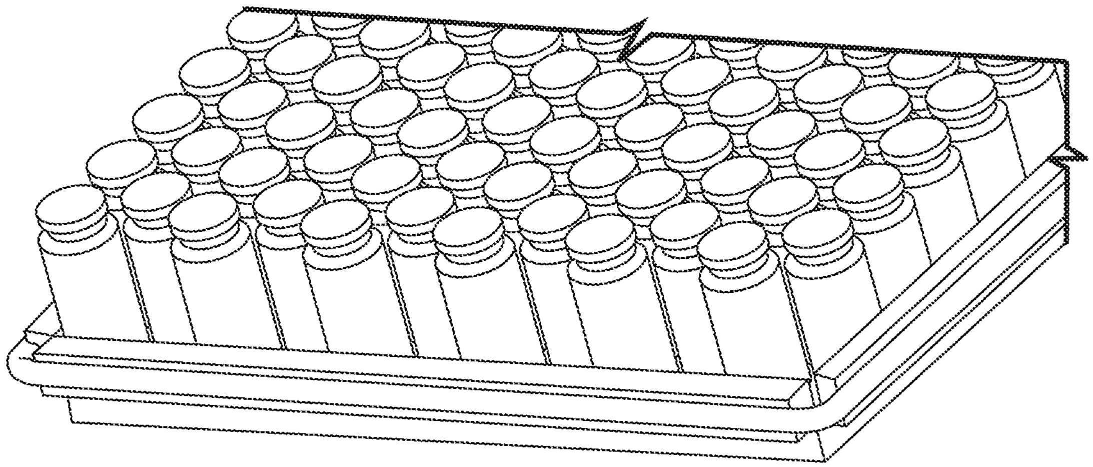

Edge Vial Elimination Apparatus for Use in any Freeze Dryer (FIGS. 13 and 14)

An apparatus that consists of a thermal emulator that surrounds a batch of vials in a laboratory, pilot, or production freeze dryer. The thermal emulator is used to eliminate the 'edge vial' effect, where the outer 2 rows of vials typically dry faster than the center vials and therefore are processed differently. The key to an effective thermal emulation apparatus is developing a sufficient heat transfer path and a method of temperature or heat flow control to simulate the dynamics of a vial in a freeze drying process. The apparatus must be able to control temperature over a wide range, for example −80° C. to +105° C., while being able to change temperature rapidly to mimic the process.

Several example methods for the thermal emulation include, but are not limited to a thermal emulator surface, such as a chamber wall, coil, plate, or other apparatus that is independent of the chamber wall and provides temperature or heat flow control to the vials by being in direct contact or close proximity to the vials or uses independent thermal conductors to transfer heat to vials The method for developing the necessary temperatures and heat flow can be varied and may include, but is not limited to, any combination of the following cooling and heating methods inside the temperature controlled surface:

Cooling using

- Flowing liquid in a coil, plate, wall or other configuration
- Direct expansion of refrigerant in a coil, plate or other configuration
- Thermoelectric device
- LN2 or Cold Nitrogen
- Cooled forced air
- CO2
- Or other cooling method Heating using a

- Flowing liquid in a coil, plate, wall or other configuration
- Resistive heating element of high or low voltage
- Thermoelectric device(s)
- Hot gas
- Forced hot air
- Or any other appropriate method The temperature controlled surface (thermal emulator) or thermal conductor may have a single point of contact, multiple points of contact, may have intimate surface contact, or may be in close proximity to the vials.

The thermal emulator may be in direct contact to a corral or tray within which the vials or material being freeze dried are placed.

The thermal conducting surfaces may be made out of a multitude of materials or may be made from a combination of materials, including but not limited to copper, stainless steel, ceramic, glass, conductive rubber, or any other appropriate material.

The thermal emulator and thermal conductor can be any shape to meet the application needs. The height of the thermal emulator and thermal conductor may be varied to simulate the height of the product in the vial or any other height that is deemed appropriate for the application.

The contact between the thermal emulator and the temperature source can be enhanced using any appropriate thermally conductive material including, but not limited to, thermal paste, heat transfer capable rubber, encapsulated paste, encapsulated fluid, glue, epoxy, solder, or any other appropriate material.

The temperature controlled surface may have a fixed or changeable surface that can be varied to a select emissivity from fully reflective to a black body.

The thermal emulator may also have the ability to produce temperature gradient between the top and bottom surface to simulate the temperature variation of the material being freeze dried. One example of this apparatus is adding a heater to the top surface to create a higher temperature on the top surface, simulating a temperature gradient similar to the dry product vs frozen product.

The thermal emulator may be placed on the shelf of the freeze dryer or may be added to the system in a manner that enables proper operation.

The apparatus is added to any freeze dryer with connections either through an available port or through the front door. It may be implemented as a stand-alone system or integrated with the freeze dryer control system and mechanical systems.

Figure 15:
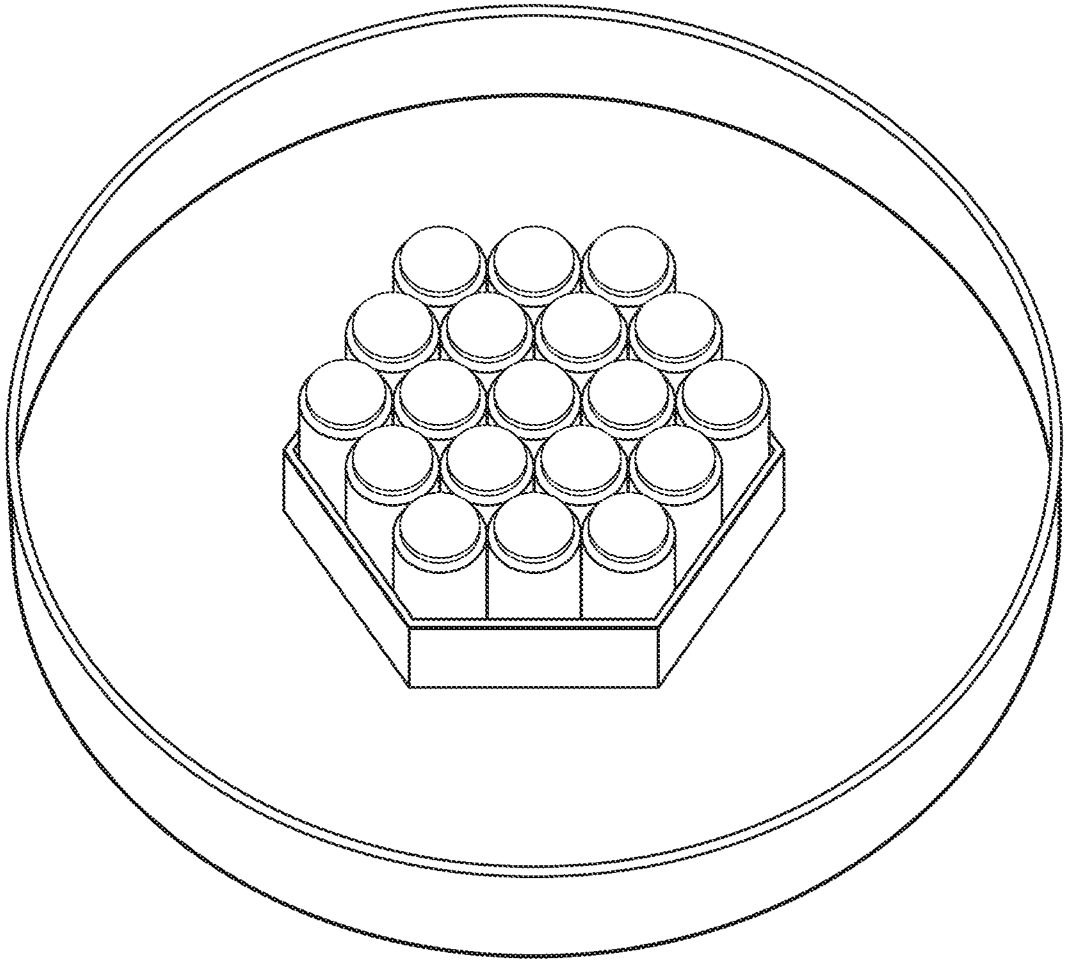
FIG. 15 is a perspective view of a circular fluid filled vessel around a 19 vial nest.
Figure 16:
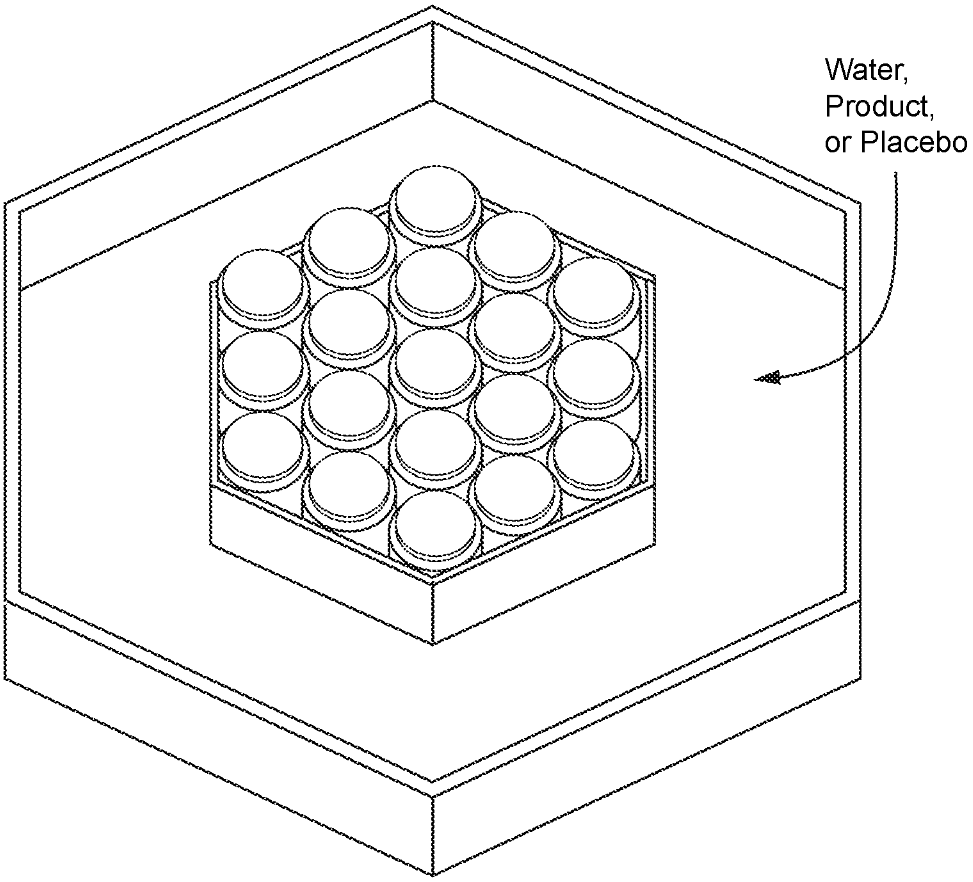
FIG. 16 is a perspective view of a hexagonal fluid filled vessel around a 19 vial nest.
Figure 17:
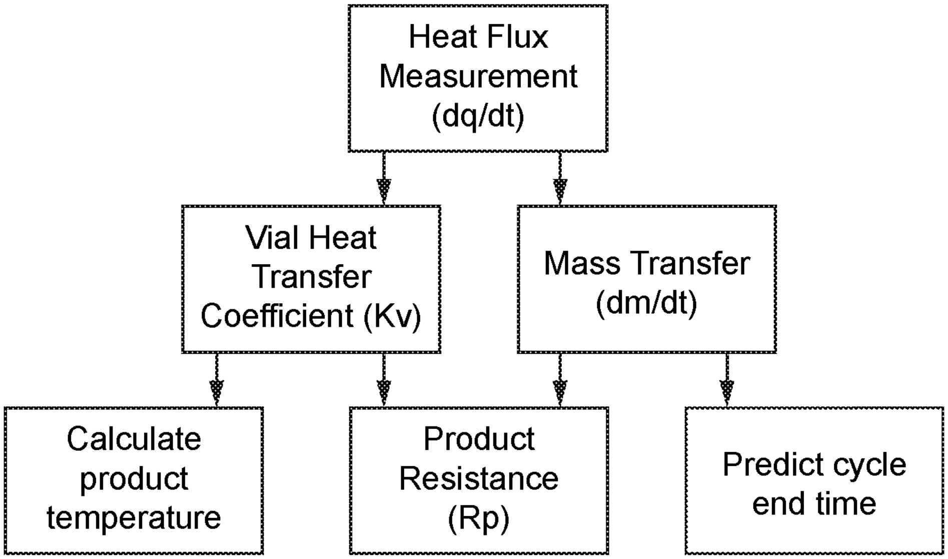
FIG. 17 is a block diagram describing how various parameters can be calculated, using the present inventive concept.

The temperature of the thermal emulator can be controlled using, but not limited to any of the following:

- A preprogrammed recipe or protocol
- Feedback of the product temperature from one or more of the vials in process
  - Thermocouple
  - Wireless temperature sensor
  - Or any other temperature sensing device
- Feedback from a heat flux sensor beneath or near the vials
- Feedback of the product temperature determined from the heat flux measurement
- Feedback of the product temperature calculated from a mass flow sensor, such as TDLAS
- Feedback from product temperature based on manometric temperature measurement
- Feedback from any other method that determines product temperature Using a Fluid Filled Vessel to Minimize or Eliminate the Edge Vial Effect. (FIGS. 15 and 16)

A unique concept, which may be used in a limited manner, is a fluid filled vessel that surrounds the vial nest, for example 1 to 37, this is in intimate contact or close proximity to the vials. Where the vessel is filled with a fluid with similar properties to the material in the vials, so that the vessel fluid will freeze and dry in a similar fashion to the material in the vials and will simulate the heat transfer dynamics of the process and can be used in any freeze dryer.

The vessel can be made from any appropriate material such as stainless steel, aluminum, copper, plastic, glass, other metal, or other material. The vessel can be designed and built to fit the vial nest and may take any convenient external shape such as circular, hexagonal, square, or any other shape.

The vessel is placed around the vials on any freeze dryer shelf at the beginning of the process and filled with an appropriate fluid. The vessel fluid should freeze in a similar fashion and dry in a similar fashion to the vials and thus minimizes the edge vial effect. Examples of fluids including but are not limited to water, the same product that is in the vials, or a placebo.

What is claimed is:

1. An apparatus for eliminating or minimizing non-uniformity of edge vials compared to center vials during freezing and/or primary drying of product therein in a freeze dryer, comprising:

a temperature controlled surface surrounding both the edge vials and the center vials, wherein the temperature controlled surface is positioned in direct contact with or direct connection to the edge vials, or connected to the edge vials via a thermal conductor, to control the temperature of the edge vials, the temperature controlled surface is closer to the surrounded edge vials than the surrounded center vials, wherein the non-uniformity of the edge vials compared to the center vials during freezing and/or primary drying of product therein in the freeze dryer is reduced by adjusting the temperature of the temperature controlled surface.

2. The apparatus of claim 1 wherein the temperature controlled surface is a thermal emulator.

3. The apparatus of claim 1 wherein the temperature controlled surface is adjusted by programmed steps or by tracking a product temperature dynamically in response to changing temperatures or heat flows of at least one measured vial.

4. The apparatus of claim 1 wherein the thermal conductor is positioned between and in direct contact with the temperature controlled surface and the edge vials.

5. The apparatus of claim 1 wherein the temperature of the temperature controlled surface is adjusted by a circulating fluid, direct expansion of refrigerant, a Peltier device or forced air or gas.

6. The apparatus of claim 1 wherein the temperature controlled surface has a ring-like configuration surrounding the edge vials.

7. An apparatus for enabling a development freeze dryer containing a small sample of product in vials to simulate freezing and sublimation conditions of product in vials in a larger batch target freeze dryer, comprising:

a temperature controlled surface surrounding both outer edge vials and center vials, wherein the temperature controlled surface is in direct contact with or direct connection to outer edge vials in the development freeze dryer, or connected to the outer edge vials via a thermal conductor, the temperature controlled surface is closer to the surrounded outer edge vials than the surrounded center vials, wherein conditions of center vials and/or outer edge vials of the larger batch target freeze dryer can be simulated by adjusting the temperature of the temperature controlled surface.

8. The apparatus of claim 7 wherein the temperature controlled surface is connected to the outer edge vials by the thermal conductor or is directly adjacent to the outer edge vials.

9. The apparatus of claim 8 wherein the thermal conductor is formed of a thermally conductive material.

10. The apparatus of claim 9 wherein the thermal conductor is formed of copper, stainless steel, aluminum, ceramic, paste, borosilicate glass and/or conductive rubber.

11. The apparatus of claim 9 wherein the thermal conductor is adjustable to provide adequate contact with the vials.

12. The apparatus of claim 9 wherein the temperature controlled surface is controlled by a circulating fluid, direct expansion of refrigerant, a Peltier device or forced air or gas.

13. The apparatus of claim 8 wherein the thermal conductor is a flexible membrane that can expand and contract for intimate contact with the outer edge vials or center vials.

14. The apparatus of claim 13 wherein the flexible membrane is filled with a thermally conductive fluid that is temperature controlled.

15. The apparatus of claim 7 wherein the temperature of the temperature controlled surface is adjusted by programmed steps or by tracking a product temperature dynamically in response to changing temperature or heat flows of at least one measured vial.

16. The apparatus of claim 7 further comprising:

a temperature controlled shelf; and a heat flux sensor configured to measure and control thermal transfer between the temperature controlled shelf and at least one vial containing a product.

17. A method of enabling a development freeze dryer containing a small sample of product in vials to simulate freezing and sublimation conditions of product in vials in a larger batch target freeze dryer, comprising:

positioning a temperature controlled surface surrounding both edge vials and center vials, wherein the temperature controlled surface is in direct contact with or direct connection to edge vials in the development freeze dryer, or connected to the edge vials via a thermal conductor, the temperature controlled surface is closer to the surrounded edge vials than the surrounded center vials, and conditions of the center vials and/or the edge vials of the larger batch target freeze dryer can be simulated by adjusting the temperature of the temperature controlled surface.

18. The method of claim 17 wherein the thermal conductor is formed of a thermally conductive material.

19. The method of claim 18 further comprising controlling the temperature of the temperature controlled surface by programmed steps or by tracking a product temperature dynamically in response to changing temperature or heat flow of any measured vial.

* * * * *